United States Patent [19]
Ban et al.

[11] Patent Number: 5,698,778
[45] Date of Patent: Dec. 16, 1997

[54] THROTTLE VALVE OPENING SENSOR

[75] Inventors: Takao Ban, Toyohashi; Hideki Kawamura, Kariya, both of Japan

[73] Assignee: Nippondenso Co., Ltd., Kariya, Japan

[21] Appl. No.: 705,177

[22] Filed: Aug. 29, 1996

[30] Foreign Application Priority Data

Aug. 31, 1995 [JP] Japan .................. 7-223975

[51] Int. Cl.$^6$ .................................................. G01B 7/30
[52] U.S. Cl. .............. 73/118.1; 324/207.2; 324/207.25; 73/DIG. 3
[58] Field of Search ........................ 73/117.2, 117.3, 73/118.1, 118.2, 116, DIG. 3; 324/207.2, 207.25

[56] References Cited

U.S. PATENT DOCUMENTS

| | | | |
|---|---|---|---|
| 4,712,420 | 12/1987 | Johansson et al. | 73/118.1 |
| 4,719,795 | 1/1988 | Eitoku et al. | 73/118.1 |
| 4,866,981 | 9/1989 | Matsumoto et al. | 73/118.1 |
| 4,893,502 | 1/1990 | Kubota et al. | 73/118.1 |
| 5,055,768 | 10/1991 | Plagens | 324/207.25 |
| 5,113,692 | 5/1992 | Kouta | 73/117.3 |
| 5,157,956 | 10/1992 | Isaji et al. | 73/118.1 |
| 5,332,965 | 7/1994 | Wolf et al. | 324/207.25 |
| 5,460,035 | 10/1995 | Pfaffenberger | 73/118.1 |
| 5,572,120 | 11/1996 | Takaishi et al. | 324/207.25 |

FOREIGN PATENT DOCUMENTS

| | | |
|---|---|---|
| 5-26610 | 2/1993 | Japan . |
| 5-157506 | 6/1993 | Japan . |
| 8-5312 | 1/1996 | Japan . |
| 8-201106 | 8/1996 | Japan . |

Primary Examiner—George M. Dombroske
Attorney, Agent, or Firm—Cushman, Darby & Cushman IP Group of Pillsbury Madison & Sutro LLP

[57] ABSTRACT

A sensor has a rotor mounted on a throttle shaft, permanent magnets mounted on an end of the rotor and rotatable together with the rotor and the throttle shaft, a Hall-effect element fixed on a rotational axis of the magnets for outputting an electric signal corresponding to the direction of the magnetic field, and a circuit member for compensating the temperature characteristics of the magnets and the Hall-effect element and for driving the Hall-effect element and processing the output from the Hall-effect element. A circuit chamber of the sensor is filled with silicon gel to add heat capacity to the circuit member. A resin member having notches around a periphery thereof is disposed in a connecting portion of the rotor at which the rotor is connected to the throttle shaft to block heat conduction from the shaft toward the magnets. Thus, the temperature conditions of the circuit member, the magnets and the Hall-effect elements are substantially equalized to achieve high precision in detection of the throttle valve opening regardless of external temperature changes.

13 Claims, 8 Drawing Sheets

PRIOR ART

THROTTLE VALVE OPENING SENSOR

CROSS-REFERENCE TO RELATED APPLICATIONS

The present application is related to and claims priority from Japanese Patent Application No. Hei 7-223975, incorporated herein by reference.

BACKGROUND OF THE INVENTION

1. Field of the Invention

The present invention relates to a vehicular throttle valve opening sensor for detecting the opening of a throttle valve, that is, an intake air adjust valve for a vehicle installed engine, and more particularly to a sensor construction suitable for use in a system that requires high detection precision in monitoring the throttle valve opening, such as a system that electronically controls the operation of the throttle valve.

2. Description of Related Art

There are two typical types of throttle valve operating mechanisms (hereinafter, simply referred to as "throttle"): a mechanical throttle that mechanically operates the throttle valve using a mechanical linkage to an accelerator pedal, and an electronic throttle that electronically controls the operation of the valve in accordance with the accelerator pedal depression and other conditions.

Figure 6:
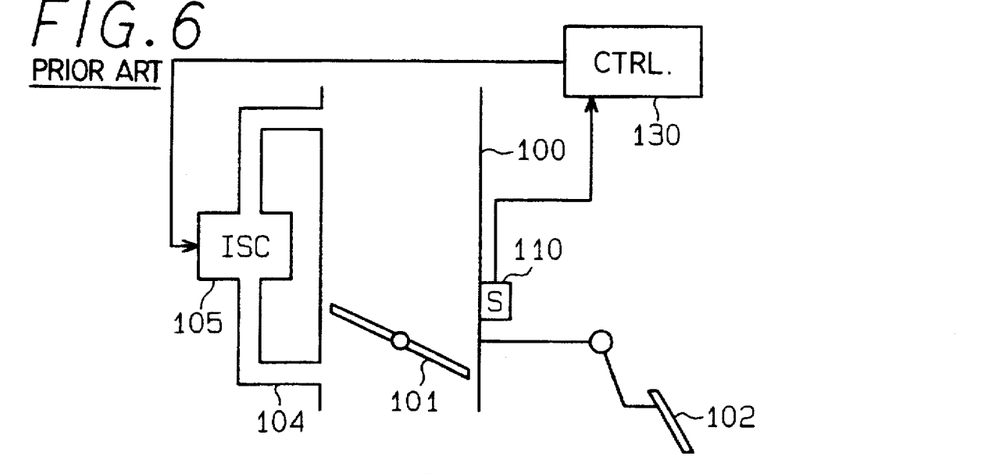
FIG. 6 is a typical construction of a mechanical throttle according to the prior art.

The construction of a mechanical throttle is schematically illustrated in FIG. 6. The mechanical throttle includes a throttle valve 101 disposed in an intake pipe 100 of an engine (not shown) for adjusting the intake air flow, and an accelerator pedal 102 mechanically linked to the throttle valve 101.

The mechanical throttle sets an opening of the throttle valve 101 directly corresponding to the amount of depression of the accelerator pedal 102. When the depression of the accelerator pedal 102 is zero, that is, when the accelerator pedal 102 is not depressed at all, the throttle valve 101 is maintained in a completely closed position.

A typical system including a mechanical throttle employs an ISC (idle speed control) device as shown in FIG. 6 to control the engine speed during idling.

The ISC device includes a bypass passage 104 connected to the intake pipe 101 and bypassing the throttle valve 101 as shown in FIG. 6, and an ISC valve 105 for opening and closing the bypass passage 104. The opening of the ISC valve 105 is controlled by an electronic control unit 130 to achieve a desired engine speed during idling when the throttle valve opening sensor 110 detects complete closure of the throttle valve 101.

With the ISC device that controls the intake air flow while the throttle valve 101 is completely closed, very stable and fine engine speed control can be realized.

Figure 7:
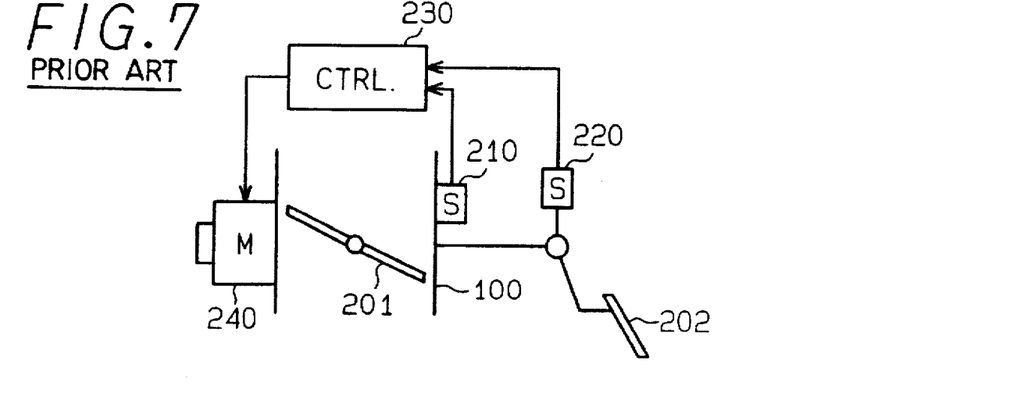
FIG. 7 is a typical construction of an electronic throttle according to the prior art.

On the other hand, an electronic throttle as shown in FIG. 7 includes a throttle valve 201 disposed in an intake pipe 100 for adjusting the intake air flow into an engine (not shown), and an accelerator pedal 202 provided mechanically independent from the throttle valve 201. Sensors 210 and 220 are provided for detecting the opening of the throttle valve 201 and the depression of the accelerator pedal 202. Using these sensors, an electronic control unit 230 normally performs feedback control as follows.

First, the unit 230 detects a depression of the accelerator pedal 202 based on the output from the accelerator pedal depression sensor 220. Then, while monitoring the output from the throttle valve opening sensor 210, the unit 230 drives the throttle valve 201 using a motor 240 to achieve an opening of the throttle valve 201 corresponding to the depression of the accelerator pedal 202.

This control performed by the electronic control unit 230 achieves an operational relationship between the throttle valve 201 and the accelerator pedal 202 as in the mechanical throttle although the throttle valve 201 and the accelerator pedal 202 are mechanically independent from each other. In some systems, the throttle valve 201 and the accelerator pedal 202 will become mechanically linked by a suitable device provided as a fail-safe function if an abnormality occurs in the electronic throttle.

In addition, the above-described electronic throttle performs the ISC or the like through the electronic control unit 230 controlling the operation of the throttle valve 201.

More specifically, the electronic control unit 230 performs feedback control as follows. First, the unit 230 detects a targeted idle engine speed and converts it into data about the opening of the throttle valve 201. Next, while monitoring the output from the throttle valve opening sensor 210, the unit 230 drives the throttle valve 201 using motor 240 to achieve an opening of the throttle valve 201 corresponding to the targeted valve opening data.

For the electronic throttle to precisely control and monitor the opening of the throttle valve 201, the detection precision of the throttle valve opening sensor 210 is crucial.

Figure 8:
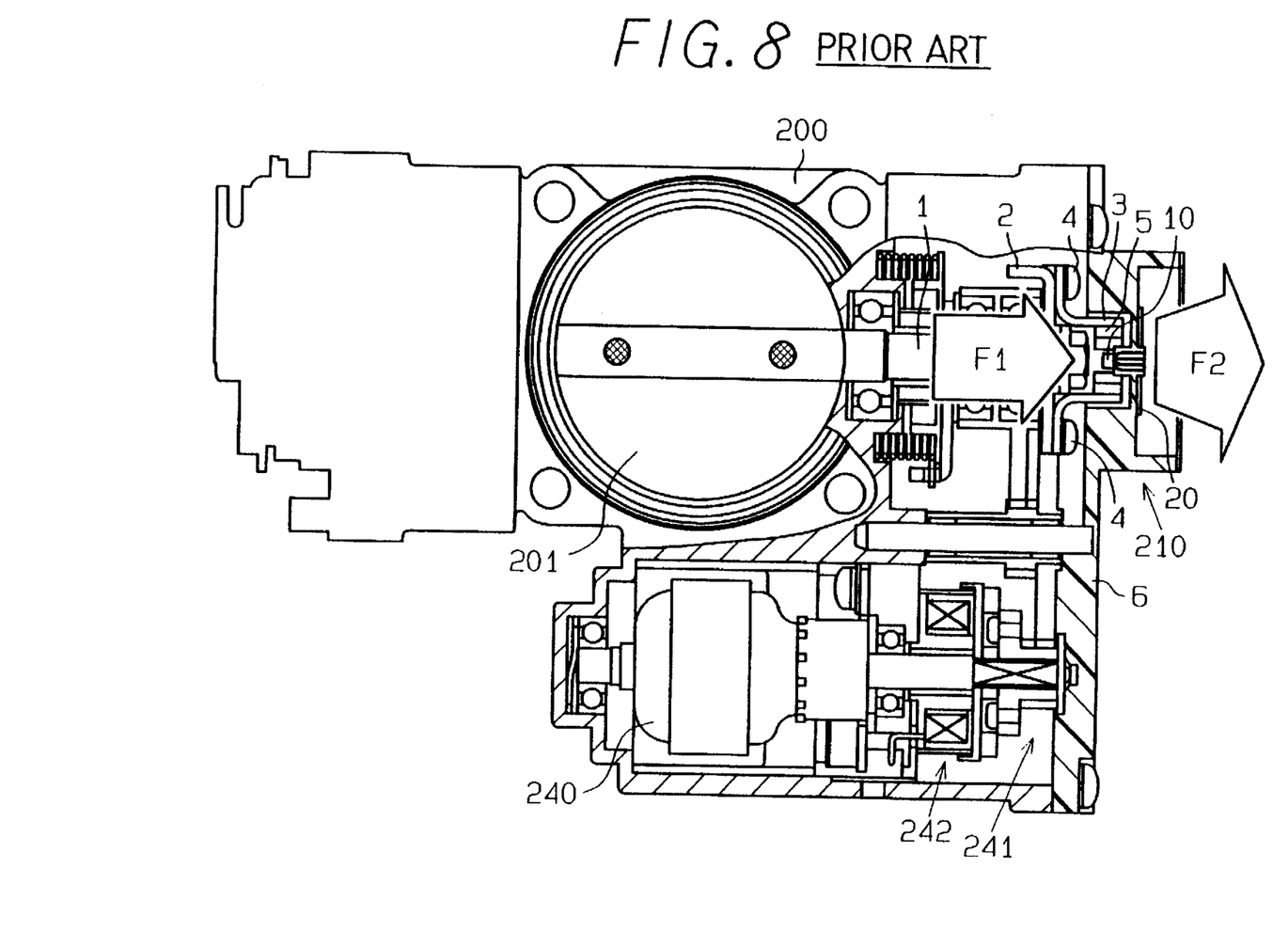
FIG. 8 is a partial cross-sectional front view of an electronic throttle according to the prior art.

FIG. 8 shows in detail the construction of the electronic throttle including the throttle valve opening sensor 210. In the throttle valve shown in FIG. 8, a throttle body 200 is attached to the intake pipe 100. Inside the throttle body 200, the throttle valve 201 is supported on its axis by the throttle shaft 1.

The throttle shaft 1 is connected to a rotational shaft of the motor 240 controlled by the electronic control unit 230 by means of a gear train 241 and an electromagnetic clutch 242.

Thus, when the motor 240 is driven while the electromagnetic clutch 242 is engaged, rotational force is transmitted from the motor 240 to the throttle shaft 1 through the gear train 241 to operate the throttle valve 201.

The throttle shaft 1 has a flange 2 on one end thereof, to which a metal rotor 3 having a hollow-cylindrical portion is fixed by screws 4.

The rotor 3, a Hall-effect element 10 and a circuit member 20 (including its substrate) for driving the Hall-effect element 10 and processing the signals from the Hall-effect element 10 constitute the throttle valve opening sensor 210. The rotor 3 has a pair of semi-cylindrical permanent magnets 5 inside its hollow-cylindrical portion. The rotor 3 and the permanent magnets 5 rotate together with the throttle shaft 1.

The Hall-effect element 10 is fixed together with the circuit member 20 inside a resin sensor housing 6, so that the Hall-effect element 10 is positioned on the rotational center axis of the permanent magnets 5 when assembled.

Thus, the throttle valve opening sensor 210 detects the rotational angle of the throttle shaft 1, that is, the opening of the throttle valve 201, in a non-contact fashion on the basis of the direction of the magnetic field applied to the Hall-effect element 10 by the permanent magnets 5.

The detection principle of the throttle valve opening sensor 210 will be explained with reference to FIGS. 9 and 10.

Figure 9A:
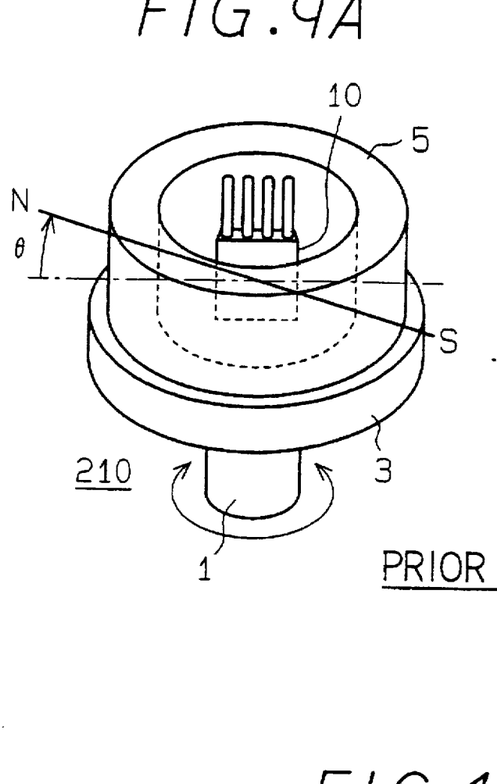
FIGS. 9A and 9B schematically illustrate the principle of the throttle valve opening detection by a Hall-effect element according to the prior art.
Figure 9B:
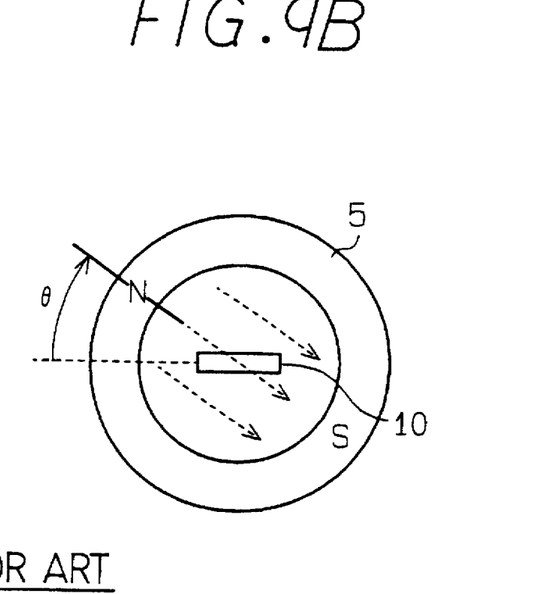

In the throttle valve opening sensor, the two semi-cylindrical permanent magnets 5 are magnetized perpendicularly to the rotational axis of the rotor 3 and are rotatable together with the throttle shaft 1, as schematically illustrated in FIGS. 9A and 9B. The Hall-effect element 10 for detecting the direction of the magnetic field of the permanent magnets 5 is disposed in a space surrounded by the permanent magnets 5, assuming a posture symmetrical about the rotational axis of the rotor 3 and parallel to a plane of the rotational axis.

When the permanent magnets 5 turn together with the throttle shaft 1 around the Hall-effect element 10 as shown in FIGS. 9A and 9B, the direction of the magnetic field shifts relative to the magnetically sensitive surface of the Hall-effect element 10. Corresponding to the shift angle q, the Hall-effect element 10 outputs an electric signal, that is, a Hall-effect voltage VH, as in Equation (1):

$$VH = KH \cdot B \cdot Rd \cdot I \cdot \sin \theta = VA \cdot \sin \theta \tag{1}$$

where KH is the sensitivity of the Hall-effect element 10, B is the magnetic flux density of the magnets 5, Rd is the internal resistance of the Hall-effect element 10, I is the drive current to the Hall-effect element 10, and VA is a constant corresponding to the value of $KH \cdot B \cdot Rd \cdot I$. As the rotor turns from $\theta = -90°$ to $\theta = +90°$, the Hall-effect voltage VH continuously varies from $-VA$ to $+VA$ along a sine curve as shown in FIG. 10.

The circuit member 20 of the throttle valve opening sensor 210 shown in FIG. 8 supplies the drive current I to the Hall-effect element 10, and processes the Hall-effect voltage VH output from the Hall-effect element 10 as mentioned above to output an electric signal corresponding to the opening of the throttle valve 201. The output from the circuit member 20 is input to the electronic control unit 230 (shown in FIG. 7) through a connector or the like (not shown).

The Hall-effect element 10 and the magnets 5 essentially have negative temperature characteristics. Therefore, as the driving conditions change with changes in the ambient temperature, the Hall-effect voltage VH also fluctuates in accordance with the temperature characteristics of the Hall-effect element 10 and the magnets 5. Such fluctuation of the Hall-effect voltage VH naturally reduces the precision of the signal processed by the circuit member 20, that is, the signal indicating the opening of the throttle valve 201.

To cope with this problem, the circuit member 20 normally includes a temperature characteristic compensating circuit that provides the drive current I with a positive temperature characteristic, thereby offsetting the temperature characteristics of the Hall-effect element 10 and the permanent magnets 5.

A conventional circuit that drives a Hall-effect element and processes the signal therefrom and that includes a temperature characteristic compensating circuit as mentioned above is described in, for example, Japanese Patent Laid-Open Publication No. Hei 5-157506.

If the temperature characteristics of the Hall-effect element or the magnets are compensated through the driving reference voltage or drive current, the reliability of the Hall-effect voltage VH therefrom is naturally increased. With increased reliability of the Hall-effect element voltage VH, it becomes possible to always maintain high precision of the sensor output from the throttle valve opening sensor.

However, since the circuit member 20 compensates the temperature characteristics of the Hall-effect element 10 or the permanent magnets 5 on the basis of the temperature conditions of the circuit member 20 itself, the compensated temperature characteristics will deviate from ideal characteristics if the circuit member 20 is under temperature conditions different from those of the Hall-effect element 5 or the permanent magnets 5.

For example, under conditions where the engine compartment temperature rapidly changes, for example, as in a case where a vehicle climbs hill, temporarily stops, and then descends, temperature differences will occur between the circuit member 20 and the Hall-effect element 10 or the permanent magnets 5. In conjunction with the hill climb-stop-descent driving pattern, the transition of the temperature conditions inside the throttle valve opening sensor and the effects thereof will be described with reference to FIGS. 8 and 11A–11C.

Figure 11A:
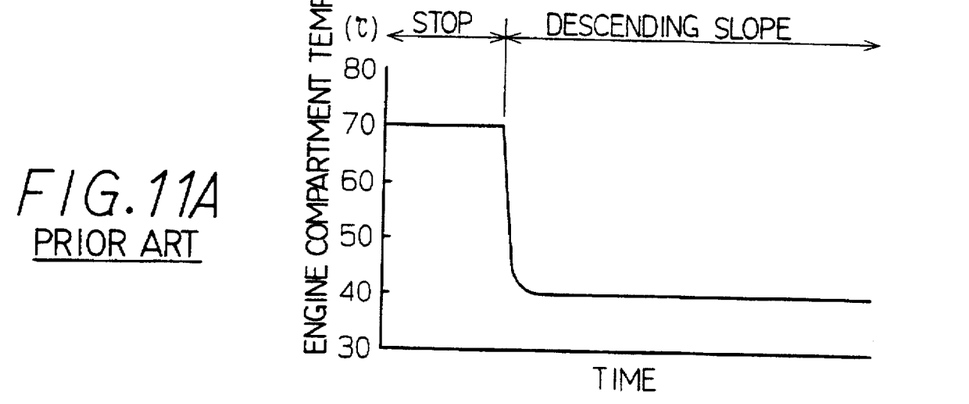
FIGS. 11A–11C are graphs showing transition of temperature of various components and factors of a conventional throttle valve opening sensor according to the prior art.

When a vehicle is stopped after climbing hill, the engine compartment temperature remains high since the engine is still hot. After the vehicle starts descending, the engine compartment temperature rapidly decreases as shown in FIG. 11A, because relatively cool air flows into the engine compartment as the vehicle goes downhill. During the descent, heat conduction occurs through the throttle valve opening sensor, that is, from the throttle body 200 toward the engine compartment atmosphere as shown by arrows F1 and F2 shown in FIG. 8. More specifically, the cooling occurs in the following sequence: the engine compartment atmosphere → the sensor housing 6 → the circuit member 20 → the Hall-effect element 10 → the permanent magnets 5 → the rotor 3 → the throttle shaft 1 → the throttle body 200.

However, the components of the throttle valve opening sensor are under different temperature conditions as follows:

(a) The circuit member 20 has a small heat capacity. Therefore, its temperature rapidly decreases during the cooling effected from the engine compartment atmosphere side.

(b) The permanent magnets 5 are connected to the throttle body 200, which has a large heat capacity so that its temperature slowly changes, by the rotor 3 and the throttle shaft 1, both of which are made of metal and have high heat conductivities. Therefore, the temperature of the magnets 5 slowly changes.

Figure 11B:
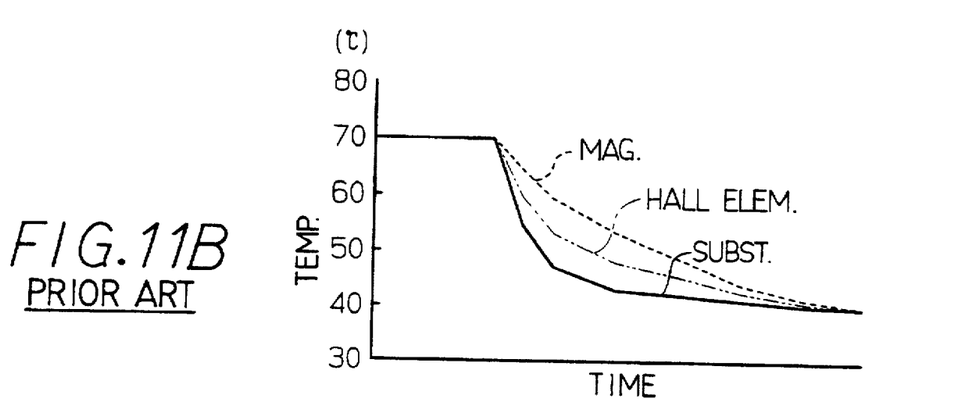

(c) Although the Hall-effect element 10 is connected electrically and mechanically to the circuit member 20, the temperature conditions of the Hall-effect element 10 are different from the circuit member 20; for example, the Hall-effect element 10 is surrounded by the permanent magnets 5, which are slow in temperature change. Consequently, the Hall-effect element 20 undergoes a slower temperature change than the circuit member 20 but a faster change than the permanent magnets 5. Thus, the circuit member 20, the Hall-effect element 10 and the permanent magnets 5 exhibit temperature differences therebetween as shown in FIG. 11B in the cooling process during the descent.

Figure 11C:
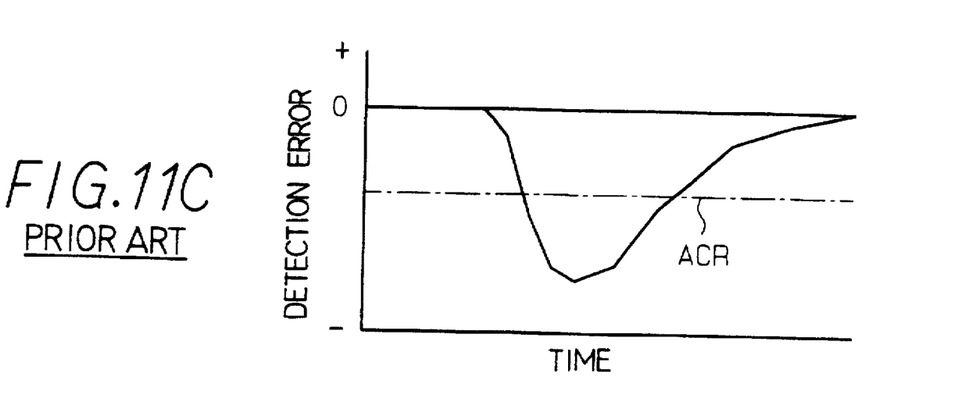

Since the circuit member 20 compensates the temperature characteristics of the Hall-effect element 10 and the permanent magnets 5 on the basis of the temperature conditions of the circuit member 20 itself, the output therefrom includes large detection errors as shown in FIG. 11C. In the graph of FIG. 11C, the level line ACR shows the precision requirement of electronic throttles.

Although the circuit member for driving the Hall-effect element and processing the signals therefrom in a conventional throttle valve opening sensor includes a temperature characteristic compensating circuit for compensating the temperature characteristics of the Hall-effect element or the permanent magnets, that circuit will fail to perform a proper temperature compensation and causes large detection errors under conditions where the engine compartment temperature rapidly changes as mentioned above.

The detection error of the throttle valve opening sensor is particularly crucial in a system that requires a high detection precision in monitoring the throttle valve opening, such as an electronic throttle that performs ISC control or the like by controlling the operation of the throttle valve.

SUMMARY OF THE INVENTION

In view of the above-described problems of the prior art, it is an object of the present invention to provide a throttle valve opening sensor able to detect the throttle valve opening with a high precision independent from an ambient temperature change even if the ambient temperature change is rapid and sharp.

The above object is achieved according to a first aspect of the present invention by providing a throttle valve opening sensor disposed on a throttle shaft which has a rotor including a connecting part made of a low heat capacity material such as resin connected to the throttle shaft and a sensing element disposed on a side of the rotor opposite the throttle shaft. Since the connecting part has low heat capacity, it reduces the conduction of heat between the throttle shaft and the sensing element. Preferably, the connecting part has slots therein to reduce its cross-sectional area, thereby further restricting heat conduction.

The above object is achieved according to a second aspect of the present invention by providing a throttle valve opening sensor disposed on a throttle shaft which has a first part of the sensor disposed in a rotor connected to the throttle shaft and a second part of the sensor disposed in a chamber in a sensor housing, where the sensor housing chamber is at least partially filled with a heat retaining substance. In this way, heat transmitted to the sensor housing is retained in the heat retaining substance, thereby slowing temperature changes in the housing even in the event of a sharp external temperature change. Preferably, the material is a layer of gel or potting material at least one millimeter thick.

Each of the above features, namely, use of the connecting part and use of the heat retaining substance, may be thought of as a means for compensating temperature transitions undergone by the throttle valve opening sensor and making the time-dependent temperature characteristics of the sensor housing approximately the same as those of the rotor.

The above object is achieved according to another aspect of the present invention by providing a throttle valve opening sensor having a Hall-effect element, accompanying magnets and diodes and transistors as voltage dropping elements in the sensor's feedback current control circuit and output voltage control circuit. Diodes and transistors normally have negative temperature characteristics as in the Hall-effect element and the magnets.

The feedback amplifier connected at its feedback line to the output voltage control circuit outputs a signal generated by stabilizing the reference voltage to a predetermined level through the voltage control performed by the output voltage control circuit. The thus-generated signal normally has negative temperature characteristics. However, by further connecting the feedback current control circuit to the feedback line of the feedback amplifier, the temperature characteristics of the output signal that include its polarity can be changed, depending on the current and voltage control amounts achieved by the feedback current control circuit and the output voltage control circuit.

If the output of the feedback amplifier is provided with positive temperature characteristics in accordance with the current and voltage control amounts achieved by the feedback current control circuit and the output voltage control circuit, the constant current-controlled drive signal will automatically acquire positive temperature characteristics, thus suitably compensating the temperature characteristics of the Hall-effect element and the magnets.

In addition, the temperature compensation can be set to desired extents in accordance with the current and voltage control amounts achieved by the feedback current control circuit and the output voltage control circuit. Therefore, if the temperature characteristics of the Hall-effect element and the magnets vary, such variation can be easily coped with or controlled.

The diodes and transistors included in the feedback current control circuits and the output voltage control circuit as well as the feedback amplifier can be easily integrated into a single semiconductor chip such as a monolithic IC.

Thus, this construction suitably facilitates miniaturization thereof including reduction of the number of component parts, while achieving high temperature compensating performance as a Hall-effect element drive circuit.

More specifically, the voltage drop across the first diode in the feedback current control circuit and the voltage drop across the second diode in the output voltage control circuit are opposite in polarity. The feedback current of the feedback amplifier is controlled on the basis of voltage drops across the diodes, which have negative temperature characteristics. Therefore, on the basis of the foregoing magnitude relationship between the first and second resistances, the polarity of the temperature characteristics of the output of the feedback amplifier is reversed.

Variations in the temperature characteristics of the Hall-effect element and the magnets can be eliminated or reduced in accordance with the ratio between the first and second resistances as long as the magnitude relationship between the first and second resistances holds. Further, it becomes possible to ignore the effect of the offset current of normally about several ten to several hundred nanoamps flowing through the feedback amplifier, and it becomes easy to set the output capacity of the feedback amplifier to a practical level suitable for ICs.

In other words, a current of ten microamps is sufficient to prevent deterioration of the temperature compensating precision which might be caused by variations of the offset current of the feedback amplifier. With a current of one milliamp, no large-capacity element is needed in the outputs of the first or second diode or the output of feedback amplifier, that is, there is no need to increase the size of the IC chip.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

The foregoing and further objects, features and advantages of the present invention will become apparent from the following description of a preferred embodiment with reference to the accompanying drawings, wherein.

DETAILED DESCRIPTION OF THE PRESENTLY PREFERRED EXEMPLARY EMBODIMENTS

Figure 10:
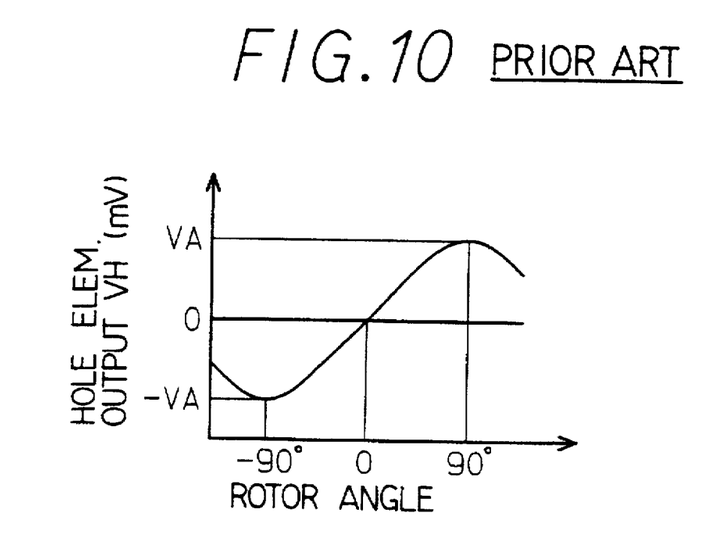
FIG. 10 is a graph showing the output characteristic of the Hall-effect element in accordance with the detection principle according to the prior art.

A preferred embodiment of a throttle valve opening sensor according to the present invention employs a Hall-effect element as an opening detecting element to detect the opening of a throttle valve in a non-contact fashion on the basis of the principle illustrated in FIGS. 9A, 9B and 10.

The construction of the embodiment will first be described with reference to FIG. 1.

Figure 1:
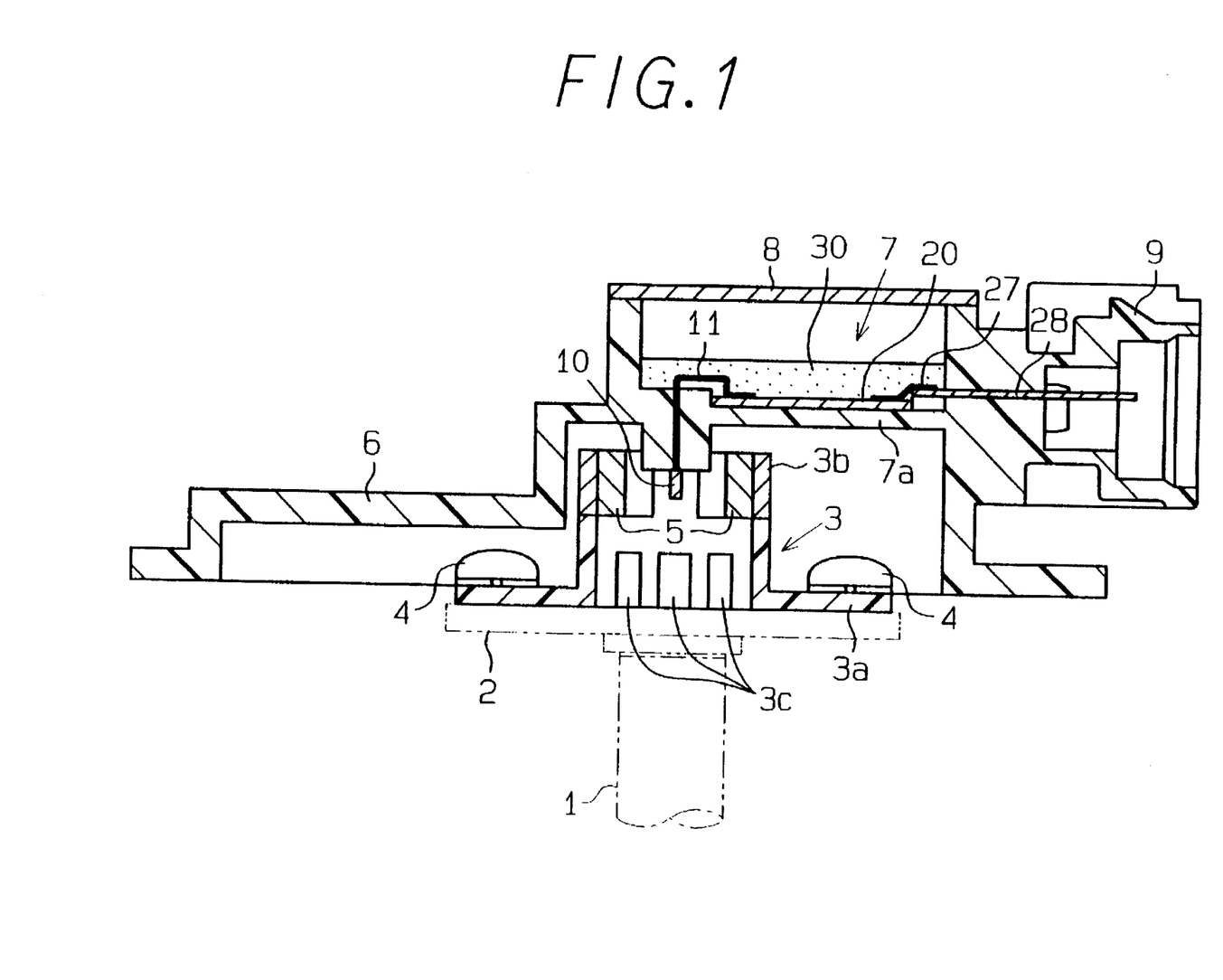
FIG. 1 is a cross-sectional view of a preferred embodiment of a throttle valve opening sensor according to the present invention.

Referring to FIG. 1, a throttle shaft 1 of an electronic throttle as shown in FIG. 8 is a metal shaft supporting a throttle valve (not shown in the Figure) on its axis. In a typical construction, the throttle shaft 1 is thermally connected to a throttle body (not shown) that has a large heat capacity.

The throttle shaft 1 has a flange 2 on one end thereof, to which a rotor 3 forming a rotation input section of the sensor is fixed by screws 4.

The rotor 3 is made of a resin or the like that has a small heat capacity, and includes many notches 3c formed on its surfaces, a hollow-cylindrical connecting part 3a connected to the flange 2, and a yoke part 3b connected integrally to the top of the connecting part 3a and made of a magnetic material such as iron. The connecting part 3a has a flanged bottom that is connected to the flange 2. Attached to the inner peripheral surface of the yoke part 3b are a pair of permanent magnets 5 forming a hollow cylindrical shape as shown in FIG. 9 and magnetized perpendicularly to the rotational axis of the rotor 3.

With this construction of the rotor 3, heat conduction thereto from the throttle shaft 1 thermally connected to the throttle body is suitably reduced or blocked by the connecting part 3a and the notches 3c since the connecting part 3a is made of a low heat capacity material, such as resin, and the notches 3c reduce the sectional area of the heat conduction passage through the connecting part 3a.

The two permanent magnets 5 attached to the yoke part 3b turn together with the rotor 3 as the throttle shaft 1 is turned to operated the throttle valve as described above. As the permanent magnets 5 turn, the direction of the magnetic field thereof is detected by a Hall-effect element 10 that forms a rotation detecting section of the sensor.

The Hall-effect element 10 is fixed integrally to a sensor housing 6 that is made of resin or the like and connected to the throttle body by screws or the like as shown in FIG. 1 so that the Hall-effect element 10 is positioned on the rotational center axis of the permanent magnets 5. Thus, the Hall-effect element 10 is subjected to parallel magnetic field produced by the permanent magnets 5 as shown in FIG. 9B.

The sensor housing 6 has a circuit chamber 7 formed in an atmosphere side portion thereof, for example, in a portion close the engine compartment. A circuit member 20 for driving the Hall-effect element 10 and processing the output from the Hall-effect element 10 is fixed to the bottom 7a of the circuit chamber 7 by adhesive or the like.

The circuit member 20 according to this embodiment employs a substrate, such as an alumina substrate, that is hard to process and makes the direct mounting of the Hall-effect element 10 thereon difficult. Consequently, the circuit member 20 and the Hall-effect element 10 are separated by the sensor housing 6 but electrically connected to each other by a Hall-effect element connecting lead 11 as shown in FIG. 1. That is, the circuit member 20 and the Hall-effect element 10 are placed under more distinctly different thermal conditions in this embodiment than in the conventional throttle valve opening sensor 210 shown in FIG. 8.

Furthermore, according to the embodiment, the circuit chamber 7 of the sensor housing 6 with the circuit member 20 disposed therein is filled with a silicon gel 30 and covered with a cover 8.

This construction of the sensor housing 6 adds heat capacity to the small heat capacity circuit member 20 so that the circuit member 20 will undergo a slow temperature change even when the atmosphere temperature at the end of the cover 8 rapidly changes. The construction thus substantially equalizes the time-dependent temperature transition characteristics of the circuit member 20 and the Hall-effect element 10.

The sensor housing 6 has a connector 9 for outputting a signal processed by the circuit member 20, that is, a signal showing the throttle valve opening, to an electronic control unit (see FIG. 7). The connector 9 has a connector terminal 28 which is connected to an output of the circuit member 20 by a lead 27.

Figure 2:
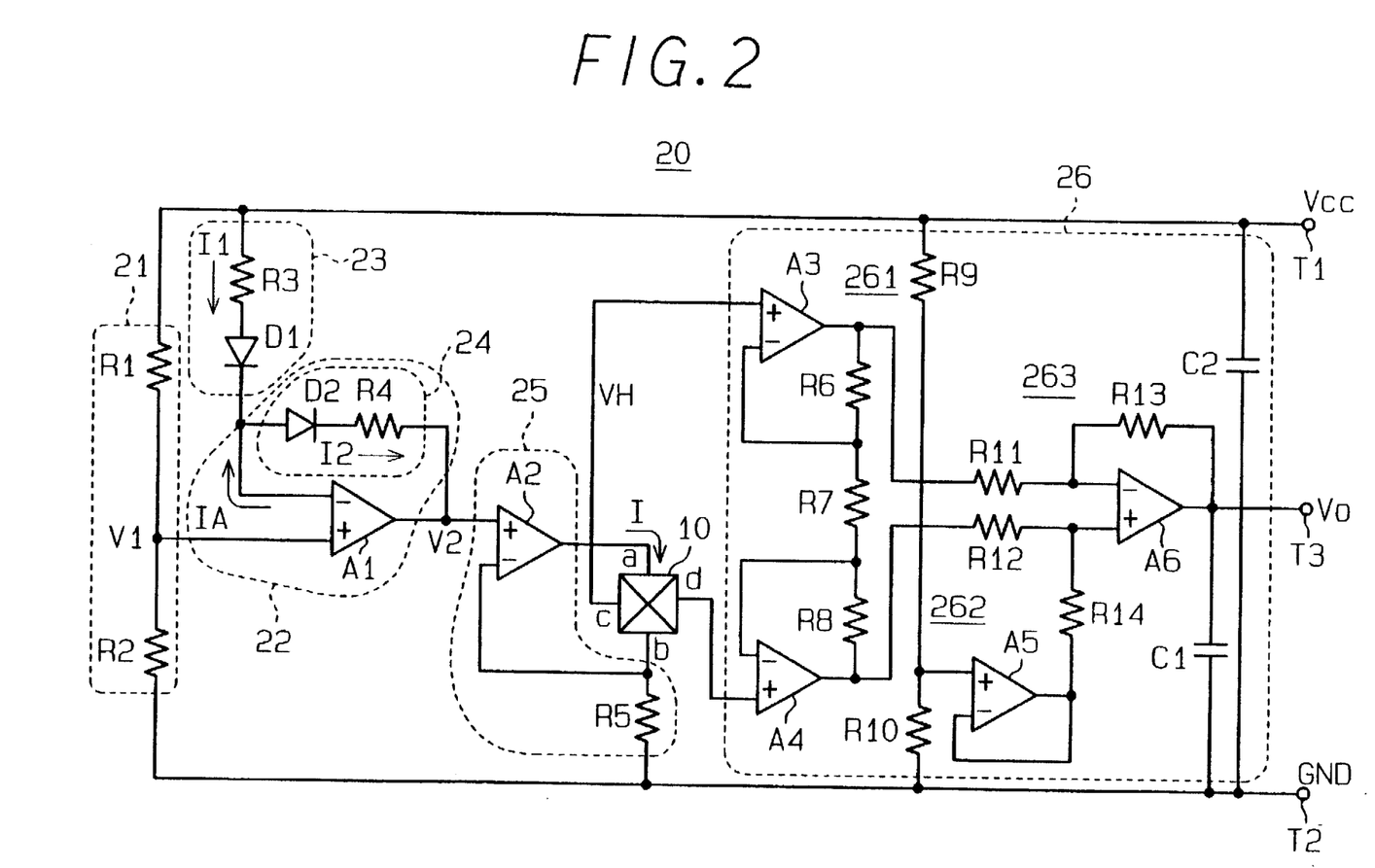
FIG. 2 is a schematic diagram of a Hall-effect element drive circuit used in the sensor shown in FIG. 2.

FIG. 2 shows a circuit diagram of a Hall-effect element drive circuit and a Hall-effect signal processing circuit provided in the circuit member 20 for driving the Hall-effect element 10 and processing the output therefrom.

The constructions of the Hall-effect element drive circuit and the Hall-effect signal processing circuit will be described with reference to FIG. 2.

The drive circuit includes a voltage divider 21 composed of a resistor R1 and a resistor R2 connected in series with each other for dividing the source voltage Vcc applied between terminals T1 and T2 as required to produce a reference voltage V1. The reference voltage V1 is supplied to the noninverting input terminal of the operational amplifier A1.

The operational amplifier A1 supplied with the reference voltage V1 constitutes a feedback amplifier 22 that outputs a reference voltage V2 used to generate a drive signal to the Hall-effect element 10.

A feedback current control circuit 23 composed of a resistor R3 and a diode D1 connected in series with each other is connected to a feedback line connecting the inverting terminal of the operational amplifier A1 and an output terminal of the feedback amplifier 22 as shown in FIG. 2. The feedback line has an output voltage control circuit 24 composed of a diode D2 and a resistor R4 connected in series. The current I2 through the feedback line of the feedback amplifier 22 is controlled by the feedback current control circuit 23 as described later.

An output from the feedback amplifier 22, that is, the reference voltage V2, is supplied to the noninverting input terminal of an operational amplifier A2. The operational amplifier A2 and a resistor R5 connected in series with the Hall-effect element 10 constitute a constant-current control circuit 25 for constant current-controlling the drive signal to the Hall-effect element 10.

The constant-current control circuit 25 controls the voltage applied to the Hall-effect element 10 by comparing the voltage drop across the resistor R5 with the reference voltage V2 so that the voltage drop across the resistor R5 will become constant. Consequently, the drive current I to the Hall-effect element 10 will become constant as shown in Equation (2):

$$I = \frac{V2}{R5} \quad (2)$$

A signal processing circuit 26 for processing a Hall-effect voltage VH output from the Hall-effect element 10 as expressed by the foregoing Equation (1) is constructed as follows.

The signal processing circuit 26 includes a buffer circuit 261 composed of operational amplifiers A3 and A4 whose noninverting input terminals receive the Hall-effect voltage VH, and resistors R6–R8. The buffer circuit 261 receives the Hall-effect voltage VH with a high input impedance and stabilizes the input voltage. The outputs from the buffer circuit 261 are input to a differential amplifier 263 composed of resistors R11 and R12, an operational amplifier A6, and its feedback and input resistors R12 and R14. The differential amplifier 263 produces an output proportional to the difference between the inputs. The output from the differential amplifier 263 is output from a terminal T3 as a sensor output Vo.

The signal processing circuit 26 further includes a reference voltage generating circuit 262 for generating a reference voltage for the differential amplifier 263. The reference voltage generating circuit 262 is composed of a voltage divider having resistors R9 and R10 and a operational amplifier A5 whose noninverting input terminal receives a divided voltage from the voltage divider. The differential amplifier 263 amplifies the difference between the outputs (the Hall-effect voltage VH) from the buffer circuit 261 in accordance with the reference voltage generated by the reference voltage generating circuit 262.

Capacitors C1 and C2 remove noise, surges and the like produced in the terminals T1 and T3.

The operation and the temperature characteristic compensating function of the Hall-effect element drive circuit will be described below.

In the following description, VF1 and VF2 represent the forward voltages (inter-terminal voltages) of the diodes D1 and D2 included in the feedback current control circuit 23 and the output voltage control circuit 24, respectively. The currents I1 and I2 through the feedback current control circuit 23 and the output voltage control circuit 24 are expressed as in Equations (3) and (4):

$$I1 = \frac{Vcc - V1 - VF1}{R3} \quad (3)$$

$$I2 = I1 + IA \quad (4)$$

where IA is offset current of the feedback amplifier 22 (the operational amplifier A1), which is usually within a range of tens of nanoamps to several hundred nanoamps. If the current I1 is set to ten microamps or greater, the current I2 will substantially become as shown in Equation (4)':

$$I2 = I1 \quad (4)'$$

If this is established, the variations of the offset current IA or the like will not degrade the temperature characteristic compensation precision described below.

If the current I1 becomes larger than a required level, the elements, such as the diodes D1 and D2, connected to the output of the operational amplifier A1 must be replaced by larger-capacity elements, which would result in an undesirably large-size monolithic IC chip incorporating the Hall-effect element drive circuit and the signal processing circuit 26, or would make it impossible to integrate the circuits into a single chip. Therefore, the current I1 is optimally within a range of 10 mA - 1 mA, and the resistor R3 needs to have a resistance that provides such an optimal value for the current I1.

In the Hall-effect element drive circuit constructed as described above, the reference voltage output from the feedback amplifier 22 is expressed as shown in Equation (5):

$$V2 = V1\left(1 + \frac{R4}{R3}\right) - Vcc\left(\frac{R4}{R3}\right) + VF1\left(\frac{R4}{R3}\right) - VF2 \quad (5)$$

The reference voltage V1 output from the voltage divider 21 is given by Equation (6):

$$V1 = \left(\frac{R2}{R1 + R2}\right) Vcc \quad (6)$$

The forward voltages VF1 and VF2 through the diodes D1 and D2 have negative temperature characteristics expressed in Equations (7) and (8):

$$VF1 = VF1(25)[1 - K1(T - 25)] \quad (7)$$

$$VF2 = VF2(25)[1 - K2(T - 25)] \quad (8)$$

where VF1(25) and VF2(25) are forward voltages at 25° C., K1 and K2 are temperature coefficients, and T is temperature.

By substitution of Equations (6)–(8) in Equation (5) followed by simplification, the following Equation (9) can be obtained:

$$V2 = Vcc\left[\frac{R2}{R1+R2}\left(1 + \frac{R4}{R3}\right) - \frac{R4}{R3}\right] + \quad (9)$$

$$VF1(25)[1 - K1(T - 25)]\frac{R4}{R3} - VF2(25)[1 - K2(T - 25)]$$

If the diodes D1 and D2 are disposed close to each other in the circuit (IC), the forward voltages VF1(25) and VF2(25) and the temperature coefficients K2 and K2 will become substantially equal and can be expressed by VF(25) and K, respectively. Thereby, Equation (9) can be written as:

$$V2 = Vcc\left[\frac{R2}{R1+R2}\left(1 + \frac{R4}{R3}\right) - \frac{R4}{R3}\right] + \quad (9)$$

$$VF(25)[1 - K(T - 25)]\left(\frac{R4}{R3} - 1\right)$$

As described above, the reference voltage V2 is input to the constant-current control circuit 25, which supplies a drive current I (=V2/R5) as in Equation (2) to the Hall-effect element 10.

The Hall-effect element 10 and the permanent magnets 5 have negative temperature characteristics as mentioned above. More specifically, the sensitivity KH and internal resistance Rd of the Hall-effect element 10 and the magnetic flux density B in the foregoing Equation (1) decrease as temperature increases.

In addition, the Hall-effect voltage VH output from the Hall-effect element 10 is proportional to the drive current I as expressed by Equation (1).

Therefore, the negative temperature characteristics of the Hall-effect element 10 and the permanent magnets 5 can be compensated by giving a positive temperature characteristic to the drive current I or the reference voltage V2.

Taking advantage of the fact that although the diodes D1 and D2 of the feedback current control circuit 23 and the output voltage control circuit 24 have negative temperature characteristics, the voltage drops across the diodes D1 and D2 are opposite in polarity as shown in Equation (5) (see the third and fourth terms on the right side), the following relationship between the resistances R3 and R4 is set:

$$R3 > R4 \qquad (11)$$

By establishing this magnitude relationship between the resistances R3 and R4, the value of (R4/R3−1) multiplied by VF(25){1−K(T−25)} in Equation (10) becomes negative and, therefore, the temperature constant −K becomes a positive value. Thus, this magnitude relationship between the resistances R3 and R4 gives the reference voltage V2 a positive temperature characteristic.

Figure 3:
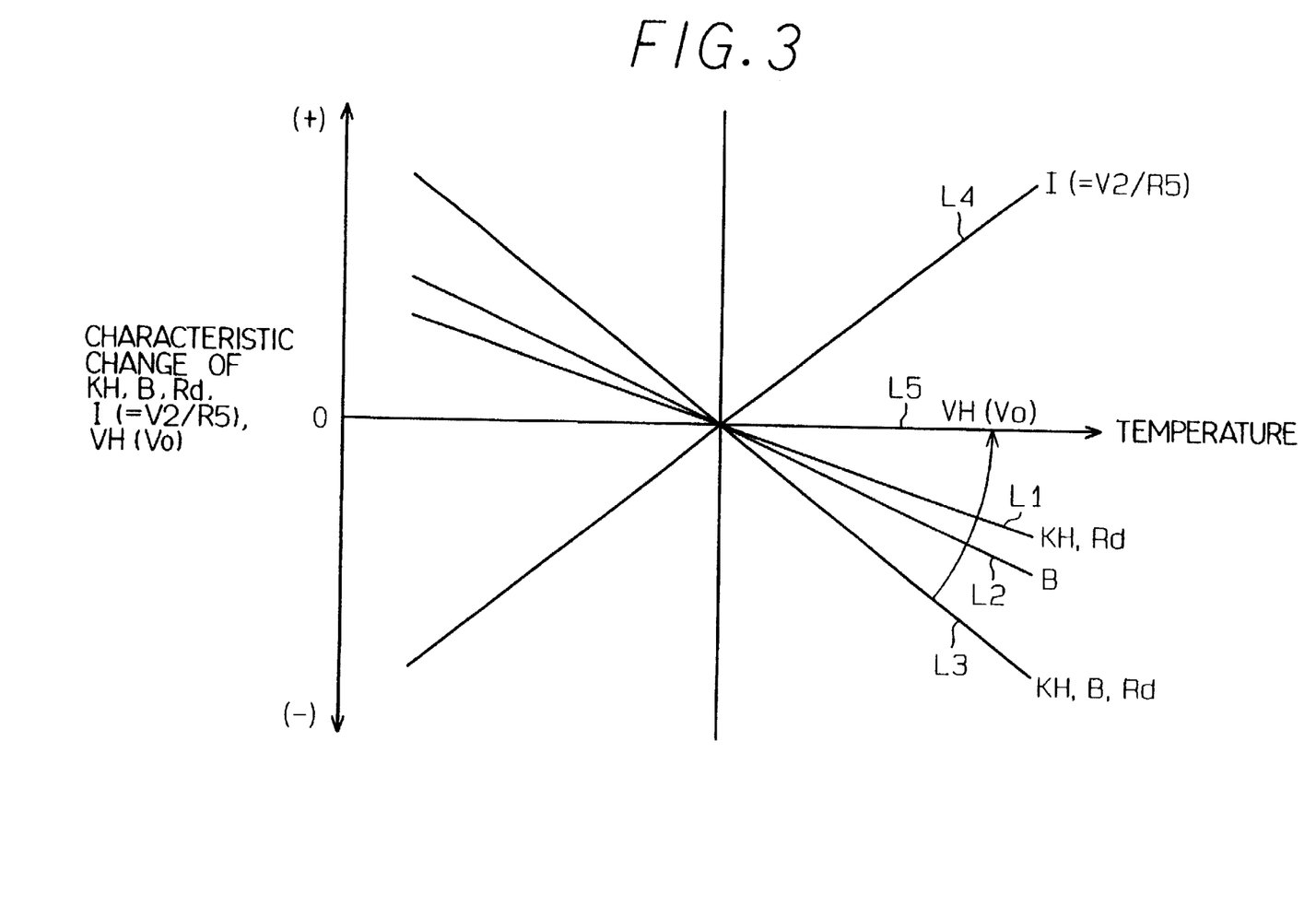
FIG. 3 is a graph showing the temperature characteristics compensated by the Hall-effect element drive circuit.

FIG. 3 shows temperature characteristic compensation performed by the Hall-effect element drive circuit. If the sensitivity KH and internal resistance Rd of the Hall-effect element 10 exhibit negative temperature characteristics as shown by a characteristic line L1 in FIG. 3 and if the magnetic flux density B of the permanent magnets 5 also exhibits negative temperature characteristics as shown by a characteristic line L2, the combination of the Hall-effect element 10 and the permanent magnets 5 exhibits temperature characteristics as shown by a characteristic line L3, that is, combined characteristics of their respective characteristics.

For the negative temperature characteristics of the Hall-effect element 10 and the permanent magnets 5, the Hall-effect element drive circuit gives the reference voltage V2 (drive current I) positive temperature characteristics as shown by a characteristic line L4 in FIG. 3, in accordance with the magnitude relationship between the resistances R3 and R4 defined by Equation (11), the ratio between the resistances R and R4, and the relationship defined by the R2/(R1+R2) term in Equation (10).

As a result, the temperature characteristics of the Hall-effect voltage VH output from the Hall-effect element 10 are compensated as shown by a characteristic line L5 in FIG. 3, so that the Hall-effect voltage VH constantly exhibits a proper value regardless of changes in ambient temperature.

The Hall-effect element drive circuit thus gives the Hall-effect element drive current I positive temperature characteristics through the feedback current control circuit 23 and the output voltage control circuit 24 having the diodes D1 and D2 and, thereby, suitably compensates the temperature characteristics of the Hall-effect element and the permanent magnets.

With the construction as described above, the Hall-effect element drive circuit makes it possible to set the temperature characteristic offset amount (that is, the slope of the characteristic line L4 in FIG. 3) to a desired amount in accordance with the current and voltage control amounts achieved by the feedback current control circuit 23 and the output voltage control circuit 24, or the voltage division ratio of the voltage divider 21 (R2/(R1+R2)). Therefore, it becomes easy to cope with variations of the temperature characteristics of the Hall-effect element and the permanent magnets if any variation occurs.

Although the Hall-effect element drive circuit provided the circuit member 20 compensates the temperature characteristics of the Hall-effect element 10 and the permanent magnets 5, there still remains a problem of temperature differences among the circuit member 20, the Hall-effect element 10 and the permanent magnets 5 occurring under conditions where the engine compartment temperature rapidly changes. Such temperature differences will impede proper compensation of the temperature characteristics of the Hall-effect element 10 and the permanent magnets 5.

According to the embodiment shown in FIG. 1, the time-dependent temperature transition characteristics of the permanent magnets 5 and the circuit member 20 are made similar to those of the Hall-effect element 10 by the following constructions.

First, the connecting part 3a of the rotor 3 thermally connected to the throttle shaft 1 is formed of a low heat capacity material, such as a resin, and the notches 3c reduce the sectional area of the heat conduction passage through the connecting part 3a. Thus, heat conduction from the throttle shaft 1 toward the rotor 3a is suitably reduced or blocked.

Second, the circuit chamber 7 of the sensor housing 6, in which the circuit member 20 is disposed, is filled with the silicon gel 30 to add heat capacity to the small heat capacity circuit member 20. Thereby, the circuit member 20 will undergo a slow temperature change even when the atmospheric temperature rapidly changes.

Figure 4A:
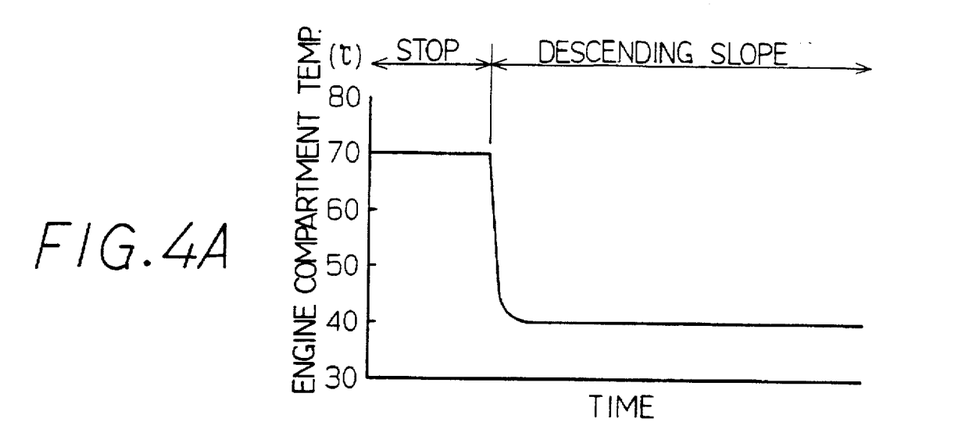
FIGS. 4A–4C are graphs showing the compensated temperature conditions of various components and factors of the sensor.
Figure 4B:
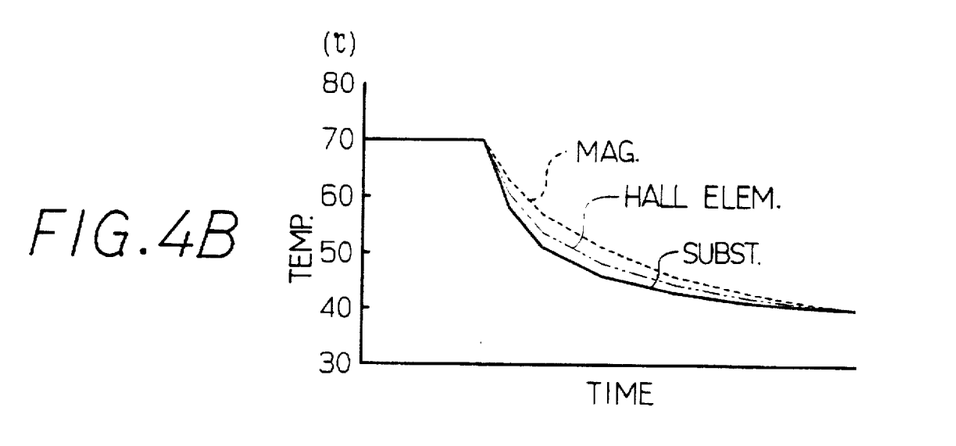
Figure 4C:
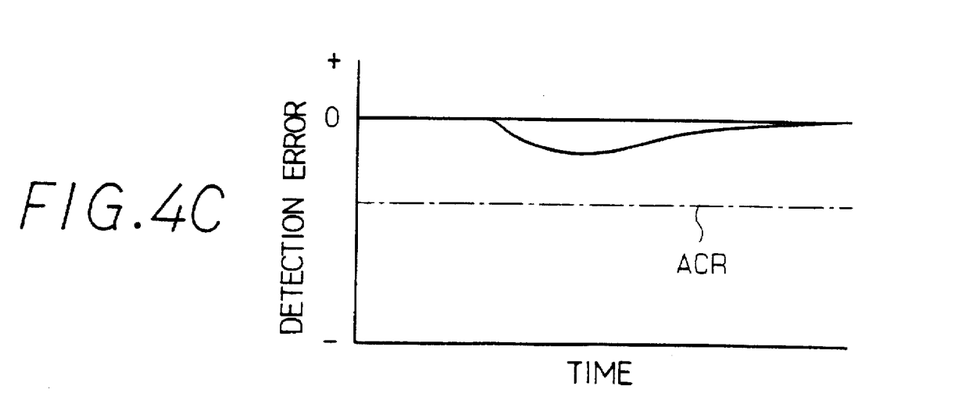

FIGS. 4A–4C show the temperature transition characteristics with regard to various components and factors according to this embodiment, in fashions comparable to those of FIGS. 11A–11C showing the temperature transition characteristics of the conventional sensor. The compensation of the temperature characteristics of the sensor according to the embodiment will be described with reference to FIGS. 4A–4C.

Assume that a vehicle climbs hill, temporarily stops and then descends, as an example case where the engine compartment temperature rapidly changes. When the vehicle is stopped after climbing hill, the engine compartment temperature remains high since the engine is still hot. After the vehicle starts descending, the engine compartment temperature rapidly decreases as shown in FIG. 4A, because relatively cool air flows into the engine compartment as the vehicle go descends. The graphs of FIG. 4A and FIG. 11C show the same driving situation.

Thus, the sensor according to this embodiment shown in FIG. 1 experiences heat conduction occurring from the throttle body (not shown) toward the engine compartment (atmosphere), as shown by arrows F1 and F2 shown in FIG. 8. More specifically, the cooling occurs in the following sequence: the engine compartment atmosphere → the sensor housing 6 (the cover 8 → the circuit chamber 7 → the silicon gel 30) → the circuit member 20 → the sensor housing 6 → the Hall-effect element 10 → the permanent magnets 5 → the rotor 3 (the yoke 3b → the connecting part 3a) → the throttle shaft 1 → the throttle body (not shown).

However, according to this embodiment, the second construction delays the temperature change in the circuit member 20 and the first construction leads to an accelerated temperature change in the permanent magnets 5.

The sensor according to this embodiment thus approximates the time-dependent temperature transition characteristics of the circuit member 20 and the permanent magnets 5 to those of the Hall-effect element 10, so that the temperature differences among these components will remain small even when the engine compartment temperature rapidly changes as shown in FIG. 4B.

As described above, the circuit member 20 according the embodiment always performs proper compensation of the temperature characteristics of the permanent magnets 5 and the Hall-effect element 10 although the temperature compensation is performed with reference to the temperature of the circuit member 20. Thereby the detection error of the sensor becomes very small as shown in FIG. 4C. The level line ACR in FIG. 4C shows the precision required for electronic throttles.

According to this embodiment, the throttle valve opening sensor achieves various advantages as follows:

(1) The temperature differences between the permanent magnets 5 and the Hall-effect element 10 are significantly reduced or eliminated even if the ambient temperature rapidly changes. As a result, the circuit member 20 always performs proper compensation of the temperature characteristics of the permanent magnets 5 and the Hall-effect element 10 although the temperature compensation is performed with reference to the temperature of the circuit member 20.

(2) The proper temperature compensation minimizes the detection error of the throttle valve opening sensor, that is, detects the throttle valve opening with a high precision unaffected by changes in ambient temperature.

(3) The Hall-effect element drive circuit provided in the circuit member 20 gives the Hall-effect element drive current I positive temperature characteristics through the feedback current control circuit 23 and the output voltage control circuit 24 including the diodes D1 and D2. Thus, the drive circuit according to the embodiment is able to compensate the temperature characteristics of the Hall-effect element 10 and the permanent magnets 5 with a higher precision than the conventional circuit disclosed in Japanese Patent Publication Laid-Open No. Hei 5-157506 which employs a temperature compensating element, such as a thermistor, whose temperature characteristics tend to vary to a great extent.

(4) With the construction described above, the Hall-effect element drive circuit allows the temperature characteristic compensation amount (the slope of the characteristic line L4 in FIG. 3) to be set to a desired amount in accordance with the current and voltage control amounts (resistance ratio R4/R3) of the feedback current control circuit 23 and the output voltage control circuit 24 or the voltage division ratio (R2/(R1+R2)) of the voltage divider 21. Therefore, it becomes easy to cope with variations in the temperature characteristics of the Hall-effect element 10 and the permanent magnets 5 if any.

(5) Since the Hall-effect element drive circuit compensates the temperature characteristics through the diodes D1 and D2 without using thermistors or the like, it is easy to integrate the circuit with the signal processing circuit 26 into a single monolithic IC.

(6) By integration of the Hall-effect element drive circuit into a single chip, the diodes D1 and D2 are naturally disposed close to each other in the IC, thereby establishing the basis for the conversion into Equation (10) where the forward voltages VF1(25) and VF2(25) are substituted with VF(25) and the temperature coefficients K1 and K2 are substituted with K. That is, it becomes possible to apply the equation in practice.

(7) Besides being provided with the same characteristics, the diodes D1 and D2 are substantially free from a problem of product variations because these semiconductor devices are produced through well-established processes under high-precision control. Therefore, practically any factory-shipped diode can be used to form a Hall-effect element drive circuit achieving the aforementioned temperature characteristic compensation with a very high precision as long as the Hall-effect element and the magnets have negative temperature characteristics as required.

(8) The resistors, as shown in FIG. 2, provided in the circuit member 20 employing an alumina substrate or the like, can be formed as thick film resistors which can be subjected to fine adjustment of their resistance values by, for example, laser trimming, even after the circuit member 20 is mounted in the circuit chamber 7. For instance, adjustment of the resistance R1, R2, R3 or R4 will adjust the temperature characteristic compensation amount achieved by the Hall-effect element drive circuit, and adjustment of the resistance R6 and R7 and R8 will adjust the output gain of the signal processing circuit 26, and adjustment of the resistance R9 or R10 will adjust the output offset of the signal processing circuit 26.

Figure 5:
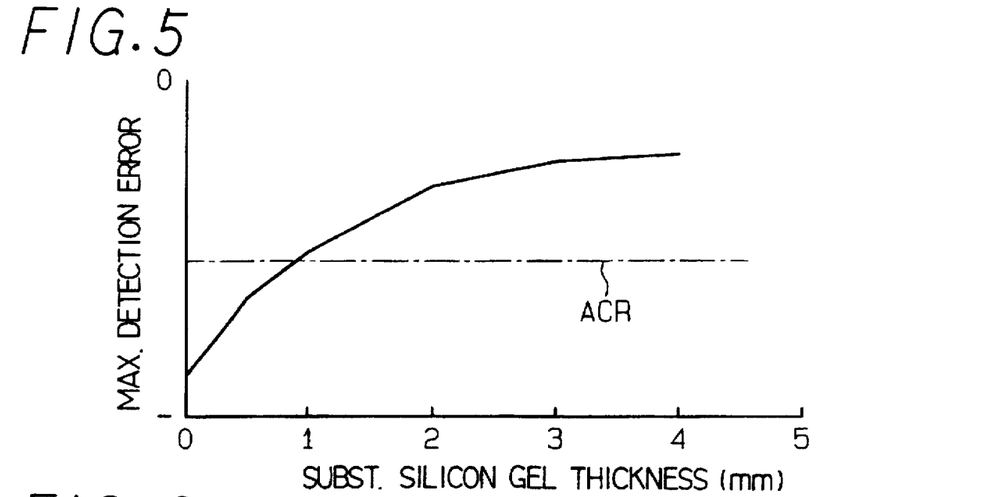
FIG. 5 is a graph showing the relationship between the silicon gel thickness on the circuit member and the detection error.

Actually using a throttle valve opening sensor according to this embodiment, the relationship between the detection error and the thickness (or quantity) of the silicon gel 30 filling in the circuit chamber of the sensor housing 6 was determined as shown in FIG. 5, wherein the level line ACR shows the precision requirement of electronic throttles.

As can be seen from the graph of FIG. 7, a thickness of the silicon gel 30 of 1 mm or greater achieves good temperature characteristic compensation with a precision within the precision requirement of electronic throttle.

FIGS. 4A–4C show the temperature condition compensation and the detection error of the sensor determined under conditions where the thickness of the silicon gel 30 is 2 mm. Although the required thickness of the silicon gel 30 slightly varies depending on the construction of the throttle to which the throttle valve opening sensor is applied and other conditions, a silicon gel thickness of 2 mm or greater should be sufficient to reliably compensate the temperature conditions of the various components (particularly, the circuit member 20), taking into account the effect of the construction of the rotor 3.

The heat retaining member filled in the circuit chamber is not limited to the silicon gel 30 but may also be made of a potting material that cures after injection.

As mentioned above, according to the embodiment, the circuit member 20 is formed of a substrate, such as an alumina substrate, that makes the direct mounting of the Hall-effect element 10 thereon difficult, and the circuit member 20 and the Hall-effect element 10 are separated by the housing 6 as shown in FIG. 1. The design where the circuit chamber is filled with an insulating member to compensate the temperature conditions of the circuit member 20 can also be applied to a construction where the circuit member 20 and the Hall-effect element 10 are disposed as shown in FIG. 8. That is, by applying a silicon gel or a potting material to the circuit member 20 as well as adopting the configuration of the rotor 3, the aforementioned temperature condition compensating functions can also be realized in a sensor as shown in FIG. 8.

In a case where the structural relationship between the circuit member 20 and the Hall-effect element 10 according to the embodiment is adopted, the Hall-effect element 10 can be connected to the housing 6 in various manners, for example:

forming the Hall-effect element integrally with the bottom wall of the housing 6;

adhering the Hall-effect element 10 to the bottom wall of the housing 6 separately formed; and mounting the Hall-effect element 10 on a holder provided on the housing 6.

Although the embodiment employs both the construction related to the rotor 3 and the construction related to the housing circuit chamber 7, one of the constructions may be omitted in a practical application according to the invention. With only one of the constructions, it is still possible to achieve the aforementioned temperature condition compensation depending on the throttle construction and installation conditions.

As for the construction related to the rotor 3, even if only the connecting part 3a made of a low heat capacity material such as resin is employed, it is possible to achieve significantly good heat conduction preventive effect.

Although the embodiment employs the permanent magnets 5 as means for producing magnet field for the Hall-effect element 10, they may be replaced by electromagnets.

Although the embodiment employs the Hall-effect element as a magnetoelectric device for converting the magnetic field information provided by the magnet means into electric signals, the Hall-effect element may be replaced by a magnetic resistance device or the like.

Although, according to the embodiment, the Hall-effect element drive circuit provided on the circuit member 20 uses the forward voltages of the diodes D1 or D2 to compensate the temperature characteristics of the Hall-effect element and the magnets, devices other than diodes may also be used for the temperature characteristic compensation. More specifically, any device may be used as long as it is a voltage dropping device that varies its voltage drop depending on temperature. For example, a transistor may be used instead of diodes. In NPN transistors, the voltage drop in the base-emitter voltage (VBE) varies depending on temperature as in the forward voltage drop of diodes. Thus, utilizing the base-emitter voltage of an NPN transistor, the temperature characteristics of the Hall-effect element and the magnets can be compensated.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A throttle valve opening sensor comprising:

a throttle shaft;

a rotor mounted on the throttle shaft and supporting a throttle valve on an axis of the throttle valve so that the rotor turns responsive to turning of the throttle shaft;

a magnet mounted on the rotor and rotatable together with the rotor, the magnet being magnetized generally perpendicularly to a rotational axis of the rotor;

a magnetoelectric element, fixed to a housing, positionable in a hollow space defined by the magnet, the magnetoelectric element outputting an electric signal corresponding to direction of a magnetic field of the magnet;

a circuit member, in a circuit chamber formed in the housing, for compensating temperature characteristics of the magnet and temperature characteristics of the magnetoelectric element and for processing an electric signal from the magnetoelectric element in a required manner; and temperature transition compensating means, including a heat retaining member at least partially filling the circuit chamber, for making time-dependent temperature transition characteristics of the magnet and the circuit member approximately equal to one another.

2. A throttle valve opening sensor comprising:

a throttle shaft;

a rotor mounted on the throttle shaft and supporting a throttle valve on an axis of the throttle valve so that the rotor turns responsive to turning of the throttle shaft;

a magnet mounted on the rotor and rotatable together with the rotor, the magnet being magnetized generally perpendicularly to a rotational axis of the rotor;

a magnetoelectric element, fixed to a housing, positionable in a hollow space defined by the magnet, the magnetoelectric element outputting an electric signal corresponding to direction of a magnetic field of the magnet;

a circuit member, in a circuit chamber formed in the housing, for compensating temperature characteristics of the magnet and temperature characteristics of the magnetoelectric element and for processing an electric signal from the magnetoelectric element in a required manner; and temperature transition compensating means for making time-dependent temperature transition characteristics of the magnet and the circuit member approximately equal to one another, wherein the temperature transition compensating means includes a heat insulating member in a junction between the rotor and the throttle shaft.

3. A throttle valve opening sensor comprising:

a throttle shaft;

a rotor mounted on the throttle shaft and supporting a throttle valve on an axis of the throttle valve so that the rotor turns responsive to turning of the throttle shaft;

a magnet mounted on the rotor and rotatable together with the rotor, the magnet being magnetized generally perpendicularly to a rotational axis of the rotor;

a magnetoelectric element, fixed to a housing, positionable in a hollow space defined by the magnet, the magnetoelectric element outputting an electric signal corresponding to direction of a magnetic field of the magnet;

a circuit member, in a circuit chamber formed in the housing, for compensating temperature characteristics of the magnet and temperature characteristics of the magnetoelectric element and for processing an electric signal from the magnetoelectric element in a required manner; and temperature transition compensating means for making time-dependent temperature transition characteristics of the magnet and the circuit member approximately equal to one another, wherein the temperature transition compensating means includes a heat retaining member at least partially filling the circuit chamber, and a heat insulating member in a junction between the rotor and the throttle shaft.

4. A throttle valve opening sensor according to claim 1 or 3, wherein the heat retaining member is made of one of a gel material and a potting material.

5. A throttle valve opening sensor according to claim 4, wherein said one of a gel material and a potting material is a layer on a surface of the circuit member, the layer being at least one millimeter thick.

6. A throttle valve opening sensor according to claim 2 or 3, wherein the heat insulating member is a resin member that connects a yoke portion of the rotor on which the magnet is mounted to a connecting portion of the throttle shaft.

7. A throttle valve opening sensor according to claim wherein the resin member has notches on a peripheral surface thereof to reduce a cross-sectional area of the resin member.

8. A throttle valve opening sensor according to claim 1, wherein:

the magnetoelectric element is a Hall-effect element;

the circuit member includes a feedback amplifier for performing feedback amplification of a reference voltage, a feedback current control circuit connected to a feedback line of the feedback amplifier and including a voltage dropping element whose voltage drop varies depending on temperature, the feedback current control circuit controlling current flowing through the feedback line, and an output voltage control circuit connected to a feedback line of the feedback amplifier and including a voltage dropping element whose voltage drop varies depending on temperature, the output voltage control circuit controlling a voltage output from the feedback amplifier; and the Hall-effect element being supplied with a drive signal based on an output from the feedback amplifier whose output voltage is controlled by the feedback current control circuit and the output voltage control circuit.

9. A throttle valve opening sensor according to claim 8, wherein:

the circuit member includes a constant-current control circuit having a resistor connected in series with the Hall-effect element, and an operational amplifier for comparing the voltage drop across the resistor with the output from the feedback amplifier and for controlling a voltage applied to the Hall-effect element so that the voltage drop across the resistor becomes constant;

wherein the constant-current control circuit supplies the drive signal to the Hall-effect element.

10. A throttle valve opening sensor according to claim 8, wherein:

the feedback current control circuit includes a first diode and a first resistor connected in series;

the output voltage control circuit includes a second diode and a second resistor connected in series; and the output from the feedback amplifier is set to a positive temperature characteristic where the resistance of the first resistor is greater than the resistance of the second resistor.

11. A throttle valve opening sensor according to claim 10, wherein:

the circuit member includes a constant-current control circuit having a resistor connected in series with the Hall-effect element, and an operational amplifier for comparing the voltage drop across the resistor with the output from the feedback amplifier and for controlling a voltage applied to the Hall-effect element so that the voltage drop across the resistor becomes constant;

wherein the constant-current control circuit supplies the drive signal to the Hall-effect element.

12. A throttle valve opening sensor according to claim 10, wherein the resistance of the first resistor of the feedback current control circuit is set so that the current flowing through the feedback line of the feedback amplifier is controlled substantially within a range of 10 mA to 1 mA.

13. A throttle valve opening sensor according to claim 12, wherein:

the circuit member includes a constant-current control circuit having a resistor connected in series with the Hall-effect element, and an operational amplifier for comparing the voltage drop across the resistor with the output from the feedback amplifier and for controlling a voltage applied to the Hall-effect element so that the voltage drop across the resistor becomes constant;

wherein the constant-current control circuit supplies the drive signal to the Hall-effect element.

* * * * *